US012619891B2

(12) United States Patent
    Wang

(10) Patent No.: US 12,619,891 B2
(45) Date of Patent: May 5, 2026

(54) METHOD AND APPARATUS FOR AUTONOMOUS DECISION OF NETWORK NODE

(71) Applicant: Telefonaktiebolaget LM Ericsson (publ), Stockholm (SE)

(72) Inventor: Zhancang Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1078 days.

(21) Appl. No.: 17/632,679

(22) PCT Filed: Aug. 5, 2019

(86) PCT No.: PCT/CN2019/099301
    § 371 (c)(1),
    (2) Date: Feb. 3, 2022

(87) PCT Pub. No.: WO2021/022455
    PCT Pub. Date: Feb. 11, 2021

(65) Prior Publication Data
    US 2022/0284328 A1     Sep. 8, 2022

(51) Int. Cl.
    *G06N 5/043*     (2023.01)
    *G06N 5/02*      (2023.01)
(52) U.S. Cl.
    CPC .............. *G06N 5/043* (2013.01); *G06N 5/02* (2013.01)
(58) Field of Classification Search
    CPC ...................................................... G06N 5/043
    USPC ............................................................ 706/45
    See application file for complete search history.

(56) References Cited

U.S. PATENT DOCUMENTS

| | | | |
|---|---|---|---|
| 7,565,433 B1 | 7/2009 | Lamport | |
| 9,513,627 B1 | 12/2016 | Elazary et al. | |
| 10,579,825 B2 * | 3/2020 | Miller | H04W 4/80 |
| 10,805,085 B1 * | 10/2020 | Liang | G06Q 20/3829 |
| 11,412,047 B2 * | 8/2022 | Jetzfellner | H04L 9/0618 |

(Continued)

FOREIGN PATENT DOCUMENTS

| | | |
|---|---|---|
| CN | 102956010 A | 3/2013 |
| CN | 103885969 A | 6/2014 |

(Continued)

OTHER PUBLICATIONS

Ferrer, "The blockchain: a new framework for robotoc swarm systems," Proceedings of the Future Technologies Conference, Jun. 25, 2017, 12 pages.

(Continued)

*Primary Examiner* — Ruay Ho
(74) *Attorney, Agent, or Firm* — Withrow & Terranova, PLLC

(57)     ABSTRACT

Embodiments of the present disclosure relate to a method and an apparatus for an autonomous decision of network node. A method performed at a first network node may comprise: broadcasting a solution for a task to a network; and performing the solution, when a plurality of verification results about the solution satisfy a predetermined condition. The plurality of verification results may be from a plurality of second network nodes in the network. According to embodiments of the present disclosure, the collaboration level between different network nodes for decision of how to operate is improved.

19 Claims, 11 Drawing Sheets

(56)                    References Cited

U.S. PATENT DOCUMENTS

2019/0034892 A1 *   1/2019  Smith .................... G06Q 40/06
2020/0364358 A1 *  11/2020  Karia .................. G06F 21/6218
2021/0053221 A1 *   2/2021  Jagannath ............ G06N 3/0499
2022/0083012 A1 *   3/2022  Luo ........................ G06N 20/00

FOREIGN PATENT DOCUMENTS

CN            107679583  A        2/2018
CN            109831425  A  *     5/2019
CN            109981286  A  *     7/2019
WO          2018004965  A1        1/2018
WO      WO-2020022956  A1  *     1/2020

OTHER PUBLICATIONS

Strobel, et al., "Managing Byzantine Robots via Blockchain Tech-
nology in a Swarm Robotics Collective Decision Making Scenario,"
Proceedings of the 17th International Conference on Autonomous
Agents and Multiagent Systems, Jul. 10, 2018, 9 pages.
Extended European Search Report for European Patent Application
No. 19940208.2, mailed Mar. 1, 2023, 8 pages.
International Search Report and Written Opinion for International
Patent Application No. PCT/CN2019/099301, mailed Apr. 28, 2020,
9 pages.

* cited by examiner

METHOD AND APPARATUS FOR AUTONOMOUS DECISION OF NETWORK NODE

This application is a 35 U.S.C. § 371 national phase filing of International Application No. PCT/CN2019/099301, filed Aug. 5, 2019, the disclosure of which is incorporated herein by reference in its entirety.

TECHNICAL FIELD

The present disclosure relates generally to the technology of autonomous decision, and in particular, to a method and an apparatus for an autonomous decision of a network node.

BACKGROUND

This section introduces aspects that may facilitate better understanding of the present disclosure. Accordingly, the statements of this section are to be read in this light and are not to be understood as admissions about what is in the prior art or what is not in the prior art.

With the development of technology of automation and communication, more and more robotics are connected with each other via a communication network, so as to form a robotics system. In such a robotics system, e.g. a swarm robotics system, a network node may be able to sense the circumstance and decide how to operate according to the situation of the circumstance.

For the decision of how to operate, a locally stored algorithm of the network node may be used. The situation of the circumstance will be an input to the algorithm and an operation manner of the network node will be the corresponding output from the algorithm. Alternatively, the network node may report the situation of the circumstance of itself to a center server/management node, and get an operation instruction directly from the center server/management node.

However, it is hard for the network node to get support/information from other network nodes during making decision of how to operate. Namely, the collaboration level may need to be further improved.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein.

A first aspect of the present disclosure provides a method performed at a first network node, comprising: broadcasting a solution for a task to a network; and performing the solution, when a plurality of verification results about the solution satisfy a predetermined condition. The plurality of verification results is from a plurality of second network nodes in the network.

In embodiments of the present disclosure, the predetermined condition may be defined via a consensus mechanism developed in the network.

In embodiments of the present disclosure, the consensus mechanism may comply with a byzantine protocol.

In embodiments of the present disclosure, the predetermined condition may comprise that a proportion of second network nodes which give a positive verification result in the network is equal to or greater than a predetermined value.

In embodiments of the present disclosure, the predetermined value may be ⅔.

In embodiments of the present disclosure, the predetermined condition may comprise that a number of second network nodes which give a positive verification result is equal to or greater than a predetermined value.

In embodiments of the present disclosure, a second network node in the plurality of second network nodes may verify the solution, based on a historical record about a solution to the same task.

In embodiments of the present disclosure, the historical record about the solution to the same task may comprise a set of criteria for computing out the solution to the task.

In embodiments of the present disclosure, the historical record may be stored in a distributed ledger in the network.

In embodiments of the present disclosure, the distributed ledger may comprise a serial data structure, or a parallel data structure.

In embodiments of the present disclosure, the serial data structure may comprise a plurality of data blocks linked in a chain.

In embodiments of the present disclosure, the parallel data structure may be based on a directed acyclic graph.

In embodiments of the present disclosure, a second network node in the plurality of second network nodes may verify the solution, based on a predetermined robotic rule set, defining allowable node behaviors for the second network node.

In embodiments of the present disclosure, the first network node may propose the solution for the task, based on a predetermined robotic rule set, defining allowable node behaviors for the first network node.

In embodiments of the present disclosure, the predetermined robotic rule set may comprise at least one of: a plan tree, configured to identify a current plan and a state of the first network node; a solver result, including a consensus result obtained from a distributed ledger; a synchronization, including a handshake among other network nodes; an allocation authority, including a conflict resolution for a task which is sent by robotic nodes to ensure that a solution with majority positive verification results resolves the conflict; and a role switch, which happens when the first network node changes its role during runtime.

In embodiments of the present disclosure, the method may further comprise: sensing ambient environment parameters; and actuating response to changes of the environment parameters.

In embodiments of the present disclosure, the first network node may comprise at least one of: a logistics robotic, an inspection robotic, a vehicle, or an emergency detection or response robotic.

A second aspect of the present disclosure provides a method performed at a second network node, comprising: receiving, from a network, a solution for a task of a first network node; verifying the solution; and broadcasting a verification result to the network. The solution is performed by the first network node, when a plurality of verification results about the solution satisfy a predetermined condition; and the plurality of verification results is from a plurality of second network nodes in the network.

In embodiments of the present disclosure, the predetermined condition may be defined via a consensus mechanism developed in the network.

In embodiments of the present disclosure, the consensus mechanism may comply with a byzantine protocol.

In embodiments of the present disclosure, the predetermined condition may comprise that a proportion of second network nodes which give a positive verification result in the network is equal to or greater than a predetermined value.

In embodiments of the present disclosure, the predetermined value may be ⅔.

In embodiments of the present disclosure, the predetermined condition may comprise that a number of second network nodes which give a positive verification result is equal to or greater than a predetermined value.

In embodiments of the present disclosure, the second network node may verify the solution, based on a historical record about a solution to the same task.

In embodiments of the present disclosure, the historical record about the solution to the same task may comprise a set of criteria for computing out the solution to the task.

In embodiments of the present disclosure, the historical record may be stored in a distributed ledger in the network.

In embodiments of the present disclosure, the distributed ledger may comprise a serial data structure, or a parallel data structure.

In embodiments of the present disclosure, the serial data structure may comprise a plurality of data blocks linked in a chain.

In embodiments of the present disclosure, the parallel data structure may be based on a directed acyclic graph.

In embodiments of the present disclosure, the second network node may verify the solution, based on a predetermined robotic rule set, defining allowable node behaviors for the second network node.

In embodiments of the present disclosure, the first network node may propose the solution for the task, based on a predetermined robotic rule set, defining allowable node behaviors for the first network node.

In embodiments of the present disclosure, the predetermined robotic rule set may comprise at least one of: a plan tree, configured to identify a current plan and a state of the first network node; a solver result, including a consensus result obtained from a distributed ledger; a synchronization, including a handshake among other network nodes; an allocation authority, including a conflict resolution for a task which is sent by robotic nodes to ensure that a solution with majority positive verification results resolves the conflict; and a role switch, which happens when the first network node changes its role during runtime.

In embodiments of the present disclosure, the method may further comprise: storing the verification result into distributed ledger.

In embodiments of the present disclosure, the second network node may comprise at least one of: a logistics robotic, an inspection robotic, a vehicle, or an emergency detection or response robotic.

A third aspect of the present disclosure provides an apparatus for a first network node, comprising: a processor; and a memory, containing instructions executable by the processor. The first network node may be operative to: broadcast a solution for a task to a network; and perform the solution, when a plurality of verification results about the solution satisfy a predetermined condition; wherein the plurality of verification results is from a plurality of second network nodes in the network.

In embodiments of the present disclosure, the first network node may be further operative to implement any of methods according to the first aspect.

A fourth aspect of the present disclosure provides an apparatus for a first network node, comprising: a broadcasting unit, configured to broadcast a solution for a task to a network; and a performing unit, configured to perform the solution, when a plurality of verification results about the solution satisfy a predetermined condition. The plurality of verification results is from a plurality of second network nodes in the network.

In embodiments of the present disclosure, the first network node may be further operative to implement any of methods according to the first aspect.

A fifth aspect of the present disclosure provides an apparatus for a second network node, comprising: a processor; and a memory, containing instructions executable by the processor. The second network node may be operative to: receive, from a network, a solution for a task of a first network node; verify the solution; and broadcast a verification result to the network. The solution is performed by the first network node, when a plurality of verification results about the solution satisfy a predetermined condition; and the plurality of verification results is from a plurality of second network nodes in the network.

In embodiments of the present disclosure, the second network node may be further operative to implement the any of methods according to the second aspect.

A sixth aspect of the present disclosure provides an apparatus for a second network node, comprising: a receiving unit, configured to receive from a network, a solution for a task of a first network node; a verifying unit, configured to verify the solution; and a broadcasting unit, configured to broadcast a verification result to the network. The solution is performed by the first network node, when a plurality of verification results about the solution satisfy a predetermined condition; and the plurality of verification results is from a plurality of second network nodes in the network.

In embodiments of the present disclosure, the second network node may be further operative to implement any of methods according to the second aspect.

A seventh aspect of the present disclosure provides a network, comprising a plurality of network nodes. The plurality of network nodes may comprise at least one of: a first network node according to any of the third aspect and the fourth aspect, or a second network node according to any of the fifth aspect and the sixth aspect.

In embodiments of the present disclosure, the first network node 100 may be defined in an RRS domain of the network, and the second network node 200 may be defined in a distributed ledger domain of the network.

An eighth aspect of the present disclosure provides an apparatus readable storage medium having a program stored thereon. The program may be executable by an apparatus to cause the apparatus to carry out any of methods according to any of the first aspect and the second aspect.

According to embodiments of the present disclosure, the collaboration level between different network nodes for decision of how to operate is improved. Particularly, the network node may operate, based on verification results from other network nodes in the network, so as to improve the efficiency and security of the network.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
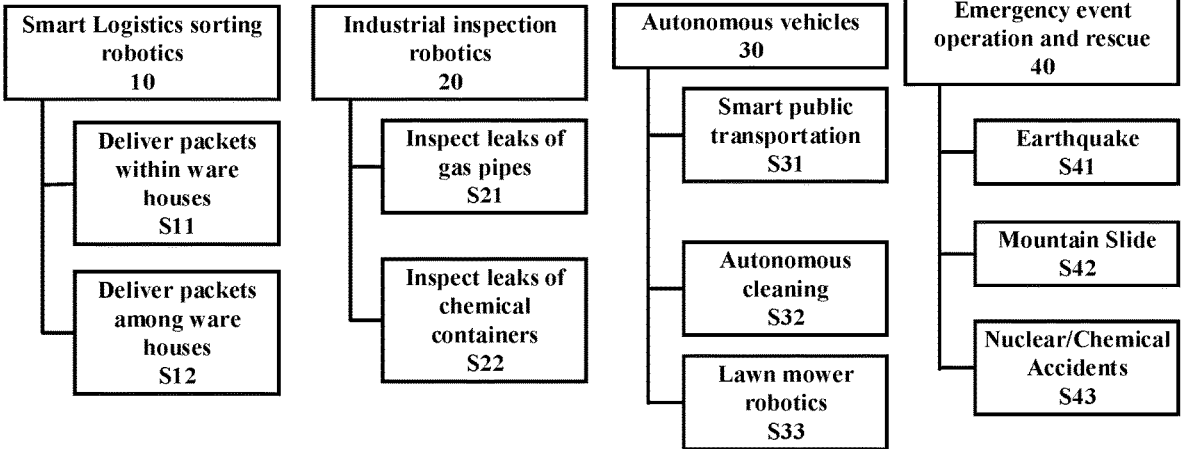
FIG. 1 is a block diagram showing various types of swarm robotics application scenarios.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to any wired or wireless network/system following any suitable communication standards. A wireless network may include new radio (NR), long term evolution (LTE), LTE-Advanced, wideband code division multiple access (WCDMA), high-speed packet access (HSPA), Wireless Fidelity (Wi-Fi), and so on. Furthermore, the communications between network node in the communication network may be performed according to any suitable generation communication protocols, including, but not limited to, the first generation (1G), the second generation (2G), 2.5G, 2.75G, the third generation (3G), 4G, 4.5G, 5G communication protocols, internet protocol (IP) and/or any other protocols either currently known or to be developed in the future.

The term "entity", "node", "network node" or "network side node" refers to a network device/apparatus with communication capability in the network. The node/entity may include a mobile phone, a stationary or mobile wireless device for machine-to-machine communication, an integrated or embedded wireless card, an externally plugged in wireless card, a vehicle, etc.

As yet another specific example, in an Internet of things (IoT) scenario, a network node may also be called an IoT device and represent a machine or other device that performs monitoring, sensing and/or measurements etc., and transmits the results of such monitoring, sensing and/or measurements etc. to another network node and/or a network equipment. The network node may in this case be a machine-to-machine (M2M) device, which may in a 3rd generation partnership project (3GPP) context be referred to as a machine-type communication (MTC) device.

As one particular example, the network node may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a network node may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 is a block diagram showing various types of swarm robotics application scenarios, particularly in 5G era.

With the development of advanced communications such as 5G, a wide variety of autonomous robotics will be constructed and deployed in ordinary life, industries and research areas etc., as shown in FIG. 1. Some of examples will be listed below.

Example 1: Logistics Sorting Robotics 10

In smart logistics, the industry uses autonomous robotics to deliver packets within or among warehouses (S11, S12).

Example 2: Industrial Inspection Robotics 20

In smart manufacturing, robotics is used to inspect leaks of gas pipes or chemical containers (S21, S22).

Example 3: Autonomous Vehicles 30

Autonomous vehicles are robotics with large scope of applications such as smart public transportation used in smart cities, S31, autonomous cleaning, S32, or lawn mower robotics, S33, used in many households.

Example 4: Emergency Event Operation and Rescue 40

In sudden catastrophic disasters, the lack of information and broken communication infrastructure increase the scale of the disaster, such an earthquake, mountain slide, fire, chemical/nuclear accident (S41, S42, S43), etc. Autonomous robotics could perform valuable information collection, rescue tasks in the first time.

The mutual nature of above application scenarios is that the groups of specialized robotics are able to perform tasks that exceed the capabilities of individuals. This shifts the main challenges from mechatronics to information technology, as comprehensive communication, coordination, and decision frameworks are essential to exploit the potential of robotic groups. The decentralized nature of group nodes cannot well match a centralized authority in case of single point failure (SPF), which require a distributed decision making and cooperative method to exchange valuable information and execute consistent decisions among nodes without a controller.

Particularly, in existing robotics systems, such as a swarm robotics system, a sustainable global communication link between the robotics is not available. Many decisions have only regional impact, the global scale is not required to make a decision. Instead, robotic nodes can build their decisions based on a local scale, which can be assumed to be within communication range. Therefore, the dynamic identification of such a local scale is one of the key problems.

Another key problem is the distribution of knowledge about past decisions. For example, in emergency response scenarios, when a robot node engages a communication island of a group of robots, which execute a task cooperatively, they need to determine the relevant past decisions for the engaging robot to enable reasoning regarding future decisions.

To meet such challenges, distributed ledger technology such as blockchain and direct acyclic graph (DAG) is introduced to improve a decision making or swarm behavior of groups of autonomous robotics. It should be understood that the distributed ledger is not limited to either blockchain or DAG.

Such distributed ledger solution may be introduced to solve above problems with below advantages.

(1) Decentralized Decision Making.

In many application scenarios, robotic nodes have to be divided into sub-groups that try to achieve partial goals. Therefore, robotic nodes may operate in separated locations. Therefore, a global communication link to a central decision-making component cannot be guaranteed, especially when considering robotic node mobility in a range-limited communication setting. A cooperative decision-making approach may be fully decentralized via present disclosure.

(2) Shared Knowledge.

In particular, large-scale or dynamic environments with many agents interacting with a potentially high number of relevant world entities make it almost impossible to establish a coherent shared world model. This is caused by the bandwidth limitations of common network interfaces that prohibit all robotic nodes' observations to be continuously shared within the group. As a result, traditional robotics cannot rely on a shared knowledge base to make common decisions. However, the present disclosure may use a distributed ledger to solve this difficulty.

(3) Dynamic Configurations.

Even in 5G, wireless communication interfaces have limitations in the communication range. Moreover, the environment constrains the communication range of robotic systems. For example, obstacles such as walls or uneven terrain may result in reflections and interference in the hardware layer, which may reduce the communication range of these nodes drastically. Since autonomous robotic nodes change their locations to implement their tasks, they can engage or leave each other's communication range. As a consequence, a distributed robot decision process needs the ability to adapt to new group configurations. Namely, engaging robotic nodes have to be discovered and incorporated into the decision process to allow for decisions, which are coherent in a local sub-group.

(4) Consensus Robustness.

Robotic observations are usually noisy and error prone. Consequently, the decisions made upon these observations suffer from the same issues. In some cases, this might lead to conflicting decision proposals. Hence, one of the key requirements in distributed decision processes is the ability to resolve these conflicts to achieve robust coherent decisions.

(5) Fault Tolerance.

Like in every distributed setting, network errors might occur, and usually result in lost data packets. A robotic decision process needs to address the problem of missing or delayed packets such that robotic nodes can detect network errors and detect individual's decisions conflicting with each other. It is necessary to enable a robotic node to correct wrong decisions to preserve a minimum level of safety properties.

Figure 2:
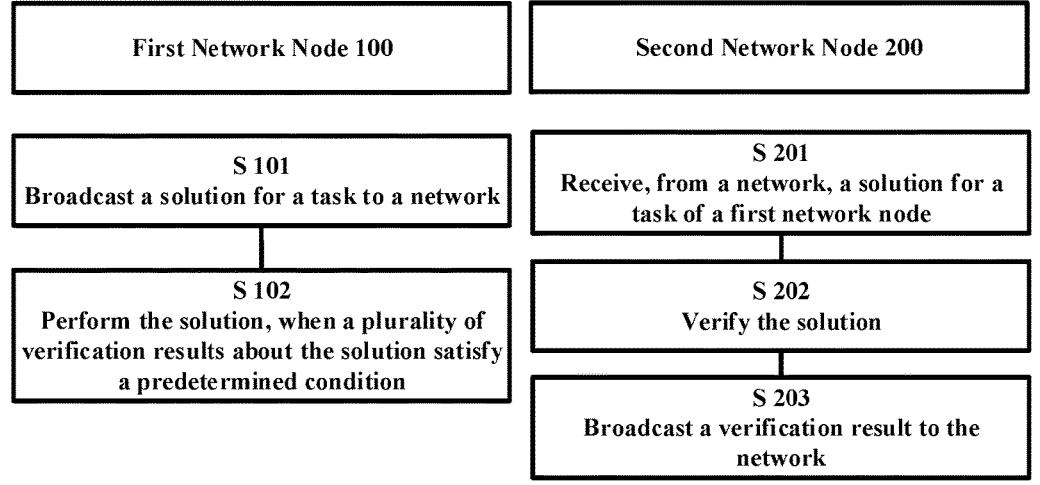
FIG. 2 is an exemplary flow chart showing a method performed at a first network node.

FIG. 2 is an exemplary flow chart showing a method performed at a first network node.

As shown in FIG. 2, a method performed at a first network node 100 comprises: step S101, broadcasting a solution for a task to a network; and step S102, performing the solution, when a plurality of verification results about the solution satisfy a predetermined condition. The plurality of verification results is from a plurality of second network nodes in the network.

According to embodiments of the present disclosure, the first network node 100 operates based on verification results from a plurality of second network nodes in the network. The collaboration level between different network nodes for decision of how to operate, as well as the efficiency and security of the network, is improved.

In embodiments of the present disclosure, the first network node may be any kind of robotics. For example, the method performed at the first network node may further comprise: sensing ambient environment parameters; and actuating response to changes of the environment parameters, so as to provide basic functions of a generally applicable robotic.

Particularly, the first network node may comprise at least one of: a logistics robotic, an inspection robotic, a vehicle, or an emergency detection or response robotic, as shown in FIG. 1.

Correspondingly, in the embodiments of the present disclosure, a method performed at a second network node 200 may comprise: step S201, receiving, from a network, a solution for a task of a first network node; step S202, verifying the solution; and step S203, broadcasting a verification result to the network. The solution is performed by the first network node, when a plurality of verification results about the solution satisfy a predetermined condition; and the plurality of verification results is from a plurality of second network nodes in the network.

In embodiments of the present disclosure, the second network node 200 may comprise at least one of: a logistics robotic, an inspection robotic, a vehicle, or an emergency detection or response robotic.

It should be understood that the terms "first network node" and "second network node" are only used for ease of clear description. There is no limitation to the implementation of the robotics. For example, as to a task, one robotic may operate as a first network node, which proposes a solution to the task. However, as to another task, the same one robotic may operate as a second network node, which verifies a solution of the another task. Moreover, the task and the another task may be processed parallelly by this robotic.

Figure 3:
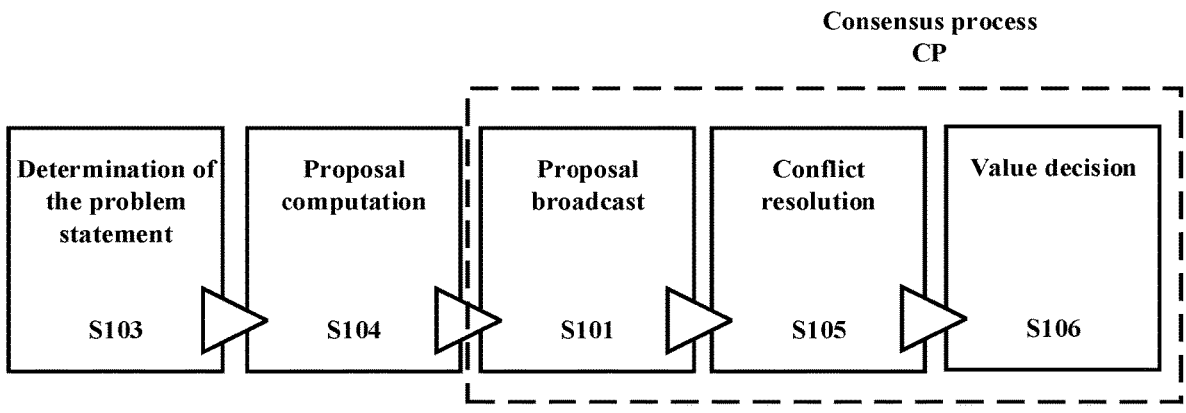
FIG. 3 is an exemplary flow chart showing additional steps of the method as shown in FIG. 2.

FIG. 3 is an exemplary flow chart showing additional steps of the method as shown in FIG. 2.

The first network node 100 may define the task in a manner which is able to be processed by the robotics. In embodiments of the present disclosure, the task may be any kind of problem needs to be solved by the robotics.

As shown in FIG. 3, for example, the first network node 100 may determine a problem statement for the task in step S103, and then process/compute the problem to obtain a proposal solution for the task in step S104.

In embodiments of the present disclosure, the predetermined condition may be defined via a consensus mechanism developed in the network.

For example, a consensus process CP may include the step S101, broadcasting a solution for a task to a network, step S105, conflict resolution, and step S106, value decision. Step S105 and step S106 are for determination of whether a plurality of verification results about the proposal solution satisfy a predetermined condition.

According to embodiments of the present disclosure, a comprehensive method is provided to realize a decision process for groups of autonomous robotics via a novel consensus scheme of a distributed ledger. It guides the generation and consensus of solution proposals. This process is adjustable to the problem setting, e.g., to achieve quick decisions or enable large number of participants and proposals.

As shown in FIG. 3, in step S103, also named as a first determination step, the problem statement is determined. It may be assumed that a common/mutual smart contract, which is distributed/broadcasted among the robotic nodes' local ledger at the time of deployment. This smart contract may describe all problem definitions that might appear during runtime. However, impreciseness of robotic observations might lead to incoherent problem statement. Embodiments of the present disclosure may use robotic rule set (RRS) to solve it by constraining the scope of robotic behaviors, which can be used as a framework to express the problem statement.

Embodiments of the present disclosure may particularly embed the decision process into the robotic rule set (RRS) coordination framework, which provides domain independence without a central coordinator. Also, it inherits RRS's locality principle that allows the determination of a validity scope for decisions.

In FIG. 3, the second step of the determination of proposals uses a generic solver that is able to compute solutions for a wide variety of robotic problems. Embodiments of the present disclosure may adopt either continuous nonlinear constraint satisfaction or optimization problems to be a suitable and extensive problem class for most robotic applications, but not be limited to these algorithms. Further, considering the required response times of many robotic systems, former solution approaches require a critical amount of computation time to find solutions for this problem class. Therefore, embodiments of the present disclosure may present an efficient solver that is able to cope with common problem instances of robotic domains in a reasonable time, based on distributed ledger technology. The exchange of the solution technique is used to increase the speed of the solution process. Consequently, the embodiments of the present disclosure provide an interface, which allows the integration of various problem-specific solution algorithms.

In FIG. 3, steps S101, S105, S106 are the final three decision steps and all for one purpose of reaching a consensus. The present disclosure may provide an adaptable solution that openly supports the distributed decision process. Especially, the handling of concurrent and possibly conflicting proposals during a consensus negotiation process may be supported. Therefore, a data-centric communication method via a distributed ledger, which could be either blockchain or DAG technology, is integrated with the robotic rule set (RRS) for swarm robotic decision making process that steers the negotiation of decision values in a replicated data space for proposals. Furthermore, the distributed ledger may be implemented with an intelligent routing protocol. In case no direct connection between two robotic nodes within the same group is possible, the routing protocol relays the relevant network packets to ensure that all robots can be reached. So, the dynamics of the global robotic nodes forms a dynamic random network with sparse and dynamic connections.

In embodiments of the present disclosure, the first network node may propose the solution for the task, based on a predetermined robotic rule set, defining allowable node behaviors for the first network node.

In embodiments of the present disclosure, the second network node 200 in the plurality of second network nodes may verify the solution, also based on a predetermined robotic rule set, defining allowable node behaviors for the second network node. Therefore, the second network node 200 may check the proposal solution from the first network node 100 under its own robotic rule set.

Figure 4:
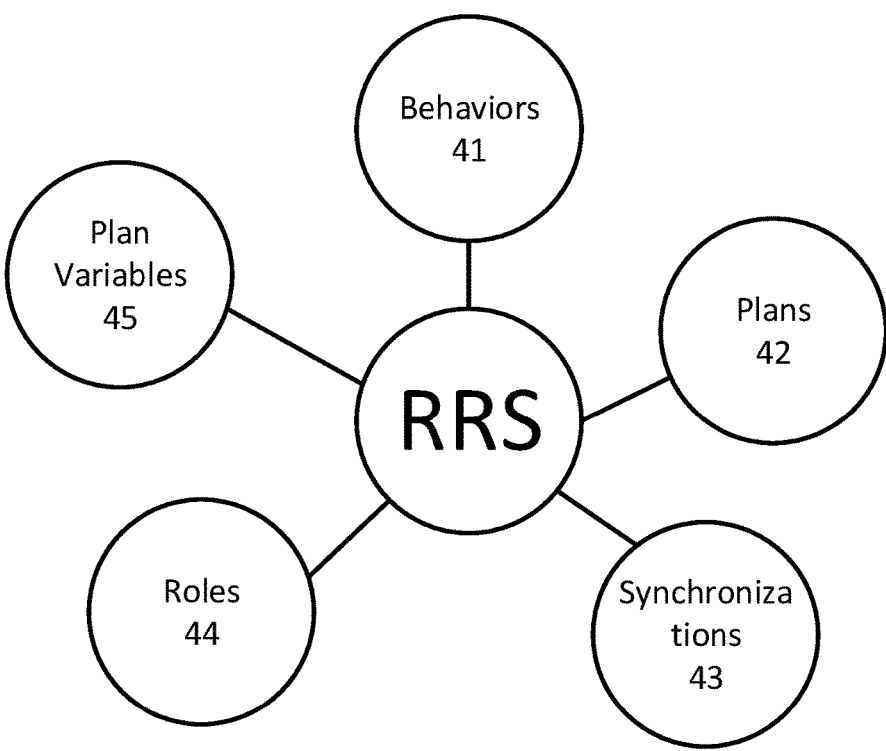
FIG. 4 is an exemplary diagram showing types of rules in robotic rule set (RRS) of embodiments of the present disclosure.

FIG. 4 is an exemplary diagram showing types of rules in robotic rule set (RRS) of embodiments of the present disclosure.

A robotic rule set (RRS) is a set of constrained conditions to define and specify multi-agent behavior, considering dynamic environments and imperfect network communication. These rules may include behaviors 41 which are the atomic activities of robotic nodes, plans 42 which are a generalization of behaviors in forms of a finite-state machines, synchronizations 43 which allow robotic nodes that transit from one state to another to reduce the required amount of communication, roles 44 which one robotic node can have multiple roles dependent on the node capabilities and finally plan variables 45 which allows to parameterize plans and behaviors with variables according to state changes.

The RRS may provide a basis to describe and execute the behavior for groups of robotic nodes in various domains such as logistic sorting robotics, autonomous car driving, or gas leakage exploration missions. Especially, the need for a unified decision process that allows for coherent decision making in RRS is highly desired. This would enable programs based on RRS to realize cooperative behavior while reducing the possibility of conflicts due to inconsistent belief bases. Additionally, the decision process requires an execution layer, which allows to perform actions to implement a common decision. As RRS can provide robustness against network delay and packet loss, it forms a solid basis for decision process in embodiments of the present disclosure. With the RRS, how to integrate it with a distributed ledger is another feature of embodiments of the present disclosure.

Figure 5:
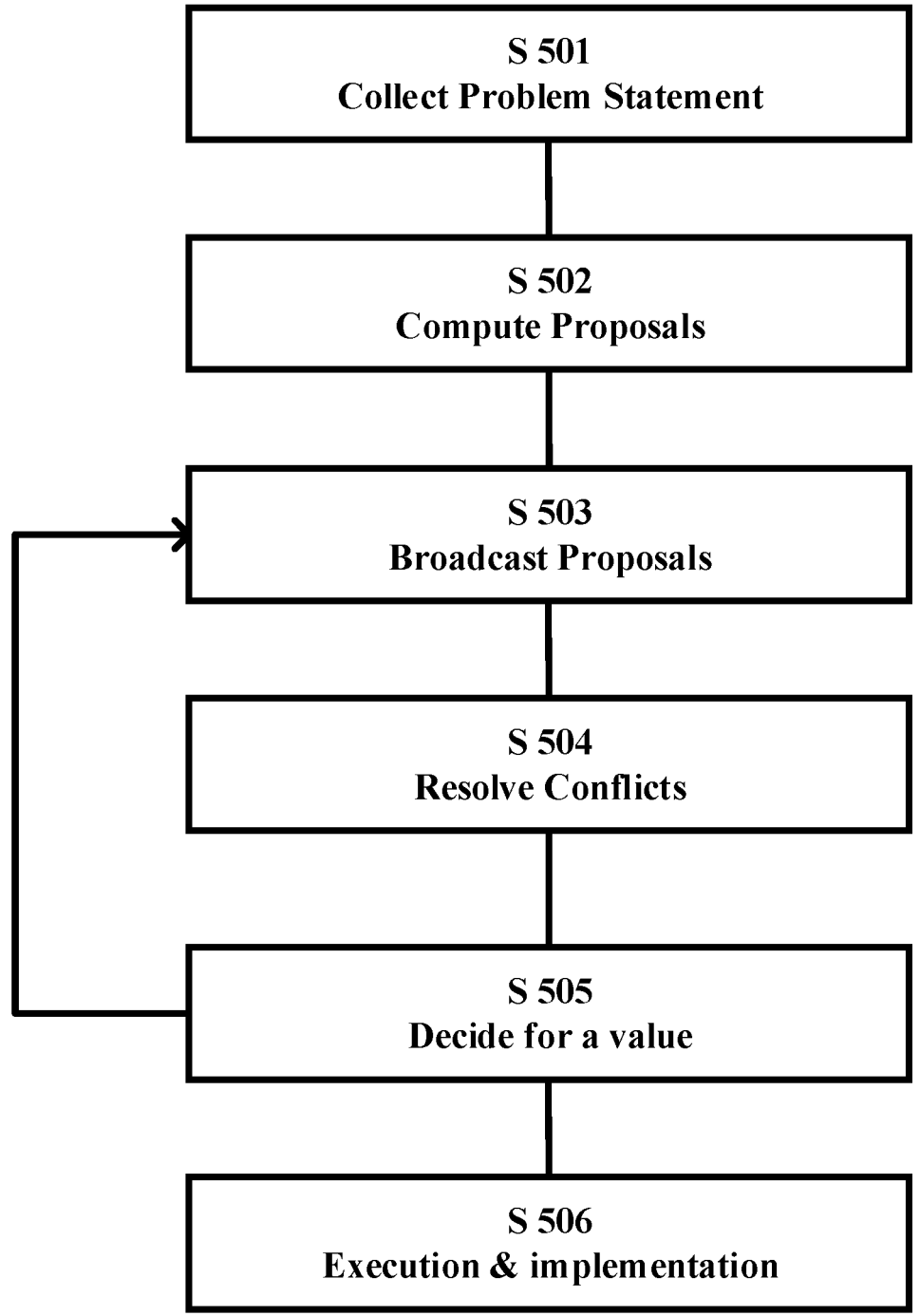
FIG. 5 is an exemplary flow chart showing a method performed at a swarm robotic node for decision process, according to embodiments of the present disclosure.

FIG. 5 is an exemplary flow chart showing a method performed at a swarm robotic node for decision process, according to embodiments of the present disclosure.

As shown in FIG. 5, embodiments of the present disclosure about the decision process may be adequately adopted for robotic applications.

The step S501 is to identify the problem statement observed from environment. Hence, it is the specification of the problem statement and collection of relevant facts. Here, the problem statement can be extracted under the constraint of RRS. The relevant constraints of the RRS is collected in a program. As the program is distributed at deployment-time on all robotic nodes, it is ensured that all robotic nodes process the same problem structure and agreement on the problem validity, which is a prerequisite for a following consensus process integrated with a distributed ledger.

The step S502 of the decision process is the computation of solution proposals. Therefore, every robotic node requiring a decision for the previously identified problem attempts to compute a solution proposal. The present disclosure does not limit the type of proposal solver. Many existing algorithms can support a computation of solution proposal. For example, a nonlinear constraint satisfaction solver based on satisfiability modulo theories and incomplete local search are feasible as a proposal solver here, which allows to solve many typical problems in a reasonable time.

Although problem statements are generic problem descriptions, the solver component is exchangeable in present disclosure. Therefore, the solvers are not limited to a specific algorithm. The decision process facilitates a problem-specific solver selection, i.e., a specialized solver selection adapts the proposal determination to the problem class. Such problem-specific solvers are advantageous, as they can rely on problem-specific assumptions to reduce the computation time. For example, a path-planning solver can make assumptions about the dynamics of the involved robotic nodes and the environment.

Also, to achieve a high performance (efficient, accurate and fast) proposal solver, multiple solvers can be combined together. For example, the solver solution techniques are satisfiability modulo theories, gradient descent, and interval propagation methods and their hybrids. The hybrid approach provides two major advantages: First, the unique combination of different techniques allows to solve relevant nonlinear problems in a reasonable time (fast enough), which is appropriate for many robotic settings. Second, the hybrid approach can be extended by new theory solvers to address an even broader range of problems for a complex robotic application scenario.

The three steps S503, S504, S505 imply a consensus negotiation protocol, which can be simplified by a technical implementation. This method performs three logical process steps: proposal distribution/broadcast, conflict resolution, and value decision. Therefore, in the proposal broadcast step, a fault-tolerant and adaptive consensus protocol replicates proposal to all robotic nodes. This forms a shared knowledge base for solution proposals.

Particularly, the last step of the decision process implements a value decision method, which applies whenever the application requests a variable value. Since the conflict resolution does not guarantee the complete elimination of conflicting proposals, the final step forces a decision to prevent the consensus process from delaying. This is equivalent to the human decision process, which uses either a democratic or an autocratic decision to select one of the remaining proposals. The consensus negotiation algorithm can use either Byzantine fault tolerance (BFT) algorithms and Non-Byzantine fault (Non-BFT) algorithms depending whether the robotic environment is open or not.

In embodiments of the present disclosure, the consensus mechanism may comply with a byzantine protocol. Further, in embodiments of the present disclosure, the predetermined condition may comprise that a proportion of second network nodes which give a positive verification result in the network is equal to or greater than a predetermined value. Particularly, in embodiments of the present disclosure, the predetermined value may be ⅔.

In embodiments of the present disclosure, the consensus mechanism may comply with a Non-Byzantine fault (Non-BFT) algorithm. Further, in embodiments of the present disclosure, the predetermined condition may comprise that a number of second network nodes which give a positive verification result is equal to or greater than a predetermined value.

In step S506, the solution verified by other nodes will be implemented.

Figure 6:
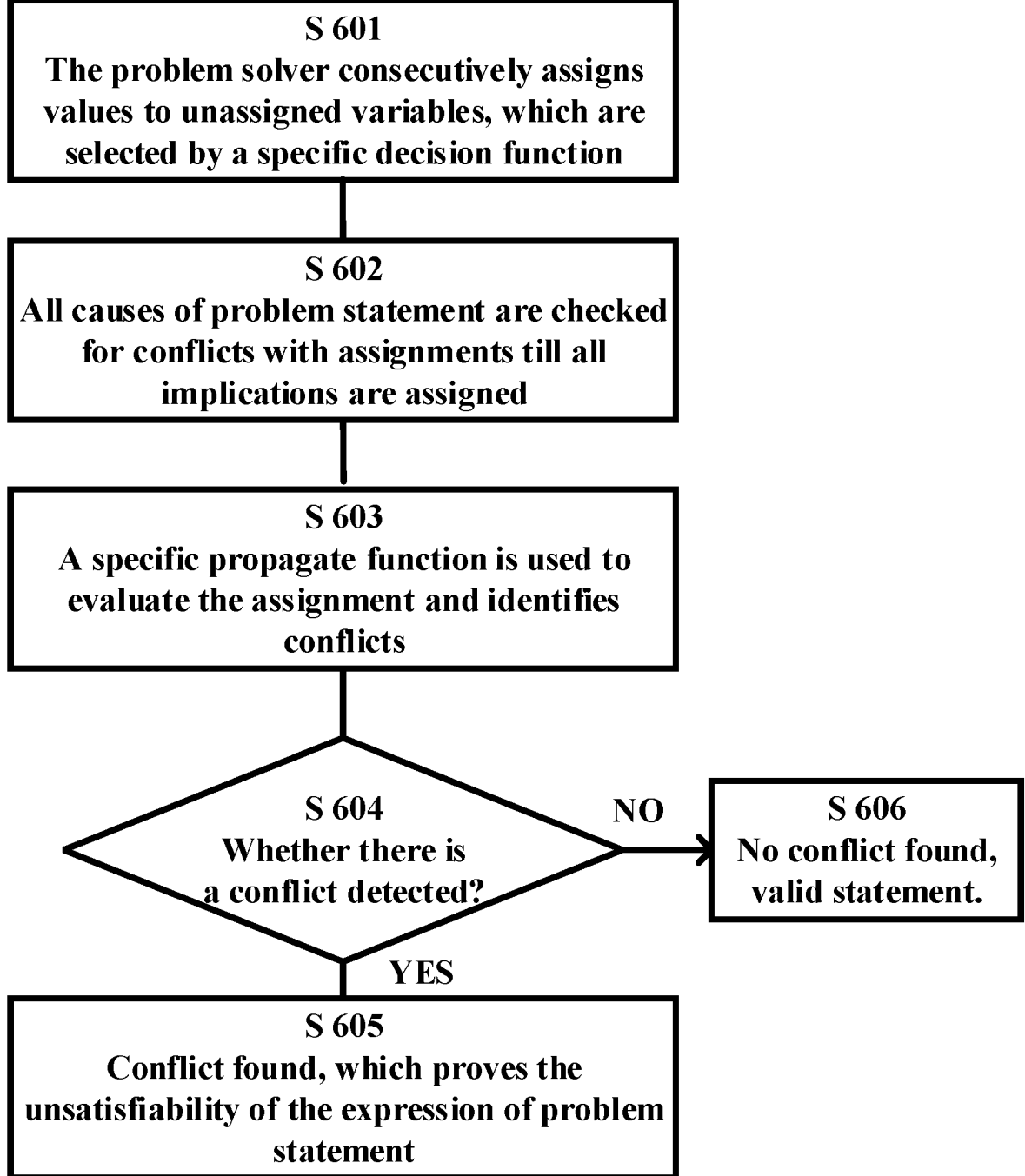
FIG. 6 is an exemplary flow chart showing a basic principle of a consensus negotiation protocol, according to embodiments of the present disclosure.

FIG. 6 is an exemplary flow chart showing a basic principle of a consensus negotiation protocol, according to embodiments of the present disclosure.

The consensus negotiation protocol also covers the conflict resolution process. Therefore, robotic nodes react to the appearance of new proposals. More precisely, they can decide to overwrite their own proposal according to a proposal knowledge base, which indicates their support for a new proposal. A conflict will be checked by robotic nodes, which determines whether a robotic node supports a new proposal value, as shown in FIG. 6. As robotic nodes may communicate their proposal changes, conflicting proposals are eliminated if the broadcast process is successful and the acceptance method constitutes consistency as a final consensus.

As shown in FIG. 6, in step S601, the problem solver consecutively assigns values to unassigned variables, which are selected by a specific decision function. In step S602, all causes of problem statement are checked for conflicts with assignments till all implications are assigned. In step S603, a specific propagate function is used to evaluate the assignment and identifies conflicts. In step S604, it is determined whether there is a conflict detected. If yes, in step S605, it proves the unsatisfiability of the expression of problem statement. If no, in step S606, it proves that the problem statement is valid.

Figure 7:
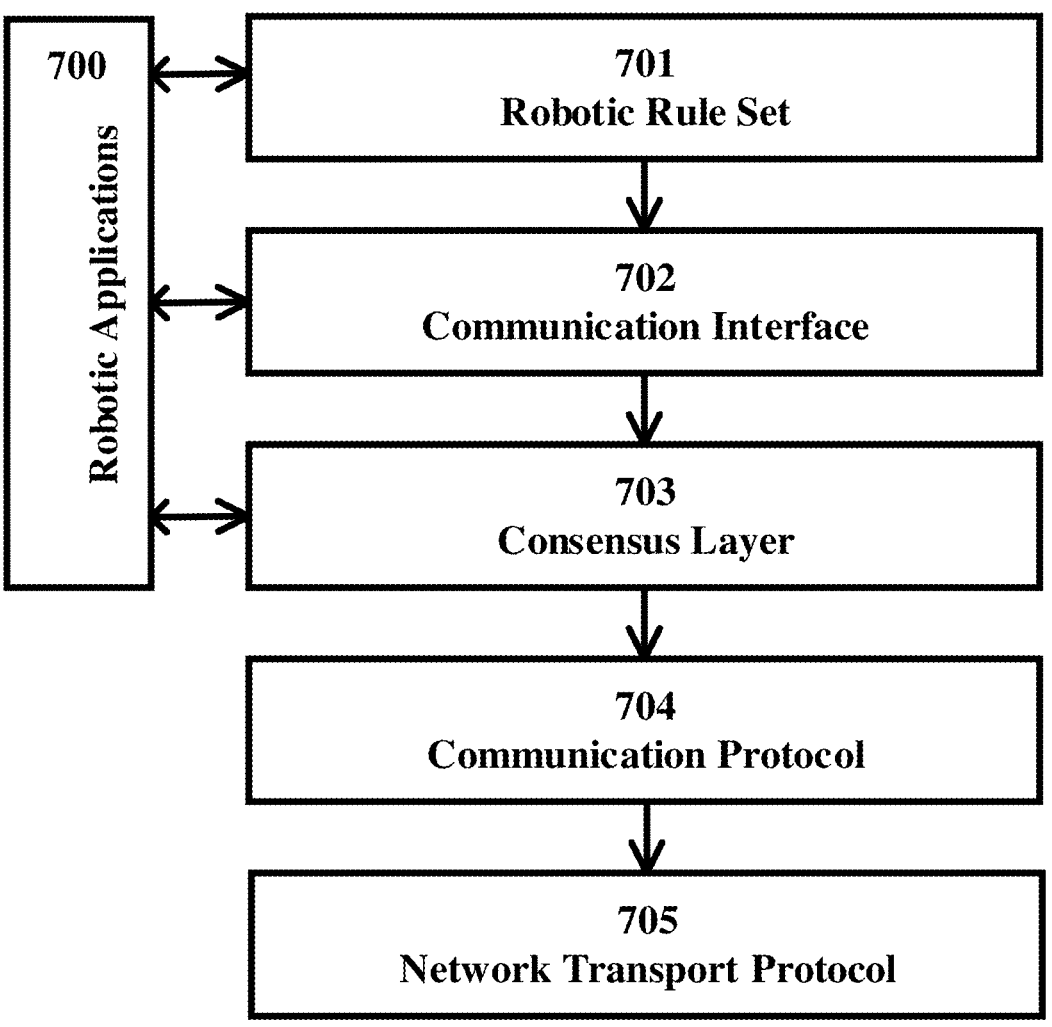
FIG. 7 is an exemplary diagram showing a layer stack for an autonomous decision of network node, according to the embodiments of the present disclosure.

FIG. 7 is an exemplary diagram showing a layer stack for an autonomous decision of network node, according to the embodiments of the present disclosure.

For introducing both RRS and ledger consensus, the stack up relationship is shown in FIG. 7 at first.

FIG. 7 gives an overview of the layer stack up of the proposed protocol structure. In FIG. 7, the combined framework of RRS and consensus negotiation abstracts the group coordination process from the robotic application. Therefore, the robotic application 700 may access three communication interface interfaces: RRS 701, which implements the execution layer and allows the group behavior description; the communication interface 702, which injects beliefs into the believe base of RRS; and the consensus layer 703, which parameterizes the communication protocol with the consistency and fault tolerance properties. The above layers 701, 702, 703 may be supported by communication protocol layer 704, and network transport protocol layer 705.

Figure 8:
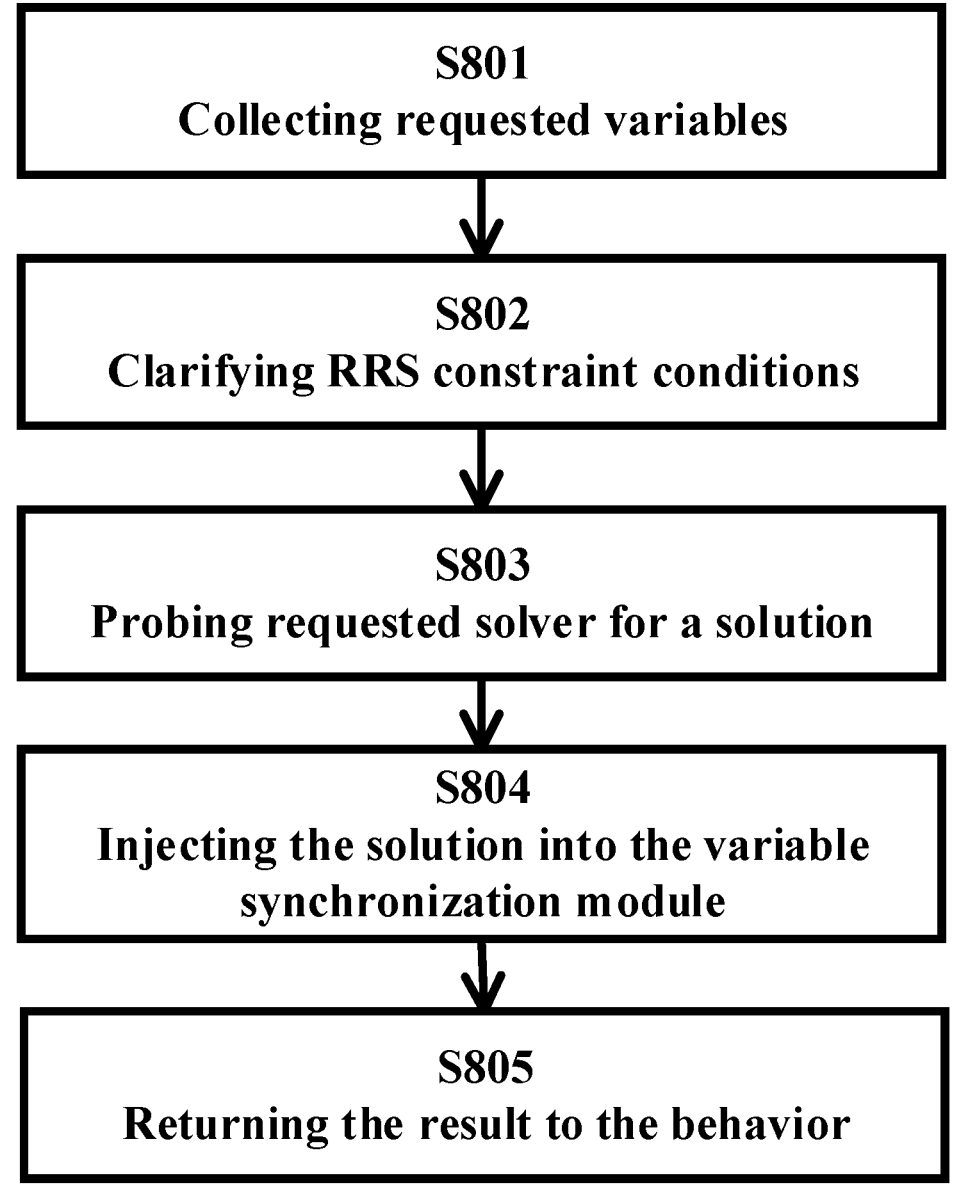
FIG. 8 is an exemplary flow chart of an RRS based program query process, according to embodiments of the present disclosure.

FIG. 8 is an exemplary flow chart of an RRS based program query process, according to embodiments of the present disclosure.

As shown in FIG. 8, the RRS based program query process performed on the first node, such as any robotic node in the swarm robotics system may include step S801, collecting requested variables relating to a task; step S802, clarifying RRS constraint conditions; step S803, probing requested solver for a solution; step S804, injecting the solution into the variable synchronization module for verification by other network nodes; and step S805, returning the result, obtained from the synchronization module, to a behavior.

As shown in FIG. 8, to start the distributed ledger consensus process for RRS variable values, a distributed ledger query is needed to be implemented. This DL query requests solutions from the distributed ledger and returns the consensus negotiated value decision. That is, the query only returns a value if the consensus process is successfully completed or not in local groups of robotic nodes. The consensus process requires the initialization by at least one robotic node distributing a solver result as proposal value. A robotic node that requires a consensus negotiated solution executes the query twice: first, a standard RRS query, and second, a consensus query. If the robotic node does not have the knowledge to compute a solution, it can wait for consensus negotiated solutions of other robotic nodes by only executing consensus query.

One advantage of the embodiments of the present disclosure is a unified decision process responsible for all decisions of RRS based robotic nodes. With the process in FIG. 8, it may be also achieved that: (1) a new interface object that implements the interaction between RRS and distributed ledger (DL) and allows the access to decision values; (2) a unified communication interface that implements the RRS based program communication with the distributed ledger.

Figure 9:
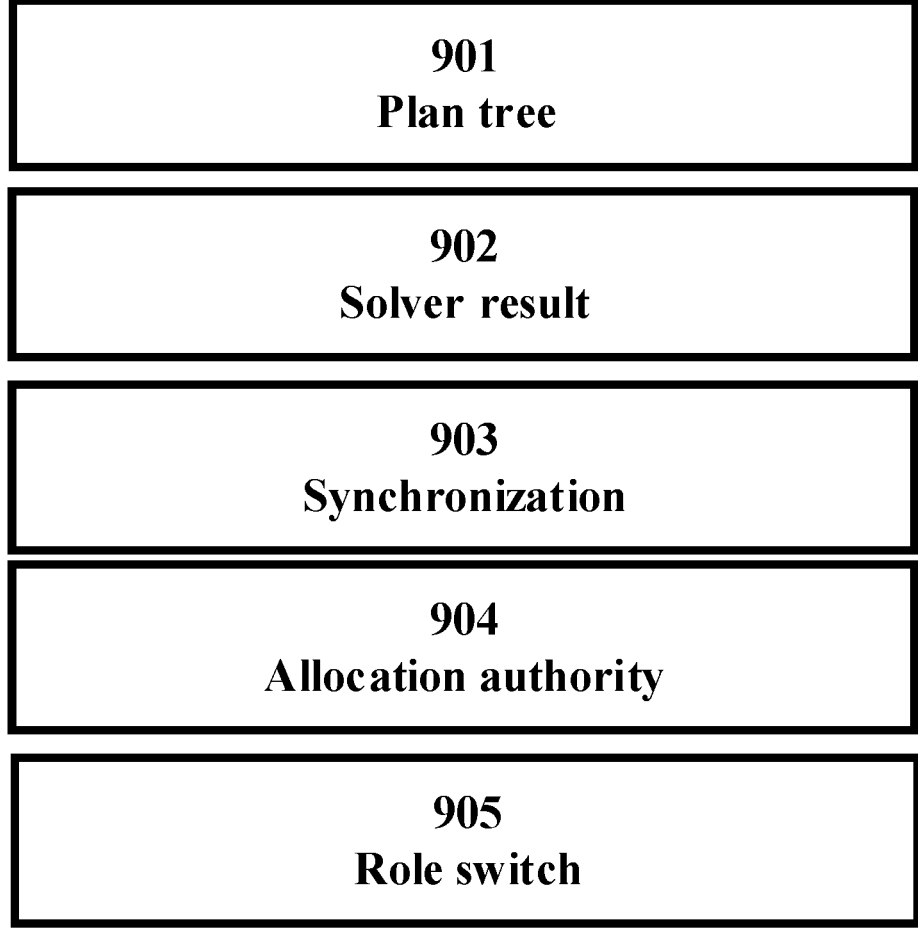
FIG. 9 is an exemplary RRS data structure in embodiments of the present disclosure.

FIG. 9 is an exemplary RRS data structure in embodiments of the present disclosure.

RRS based programs or even smart contracts need a unified communication interface, which transmits executed plans, synchronizations, and authority information to distributed ledger. To integrate the distributed ledger as communication middleware and to make RRS based programs to a more generic framework, the communication functionalities are grouped and provided a single interface. This interface may serialize, transmit, and receive the data structures of RRS based programs as shown in FIG. 9.

As shown in FIG. 9, there are five sections of messages in the data structure for the predetermined robotic rule set RRS: a plan tree 901, configured to identify a current plan and a state of the first network node; a solver result 902, including a consensus result obtained from a distributed ledger; a synchronization 903, including a handshake among other network nodes; an allocation authority 904, including a conflict resolution for a task which is sent by robotic nodes to ensure that a solution with majority positive verification results resolves the conflict; and a role switch 905, which happens when the first network node changes its role during runtime.

Specifically, plan tree identifies the current plan and state when RRS iteratively sends messages. Solver result allows to replace distributed ledger consensus by other decision middleware with similar negotiation function when the variable synchronization module distributes solver solutions among the robotic nodes with RRS. Synchronizations are realized as a three-way handshake and therefore require two messages: one message transmits the information that synchronous transition is requested and another is needed to realize the acknowledgment. Allocation authority is part of the conflict resolution in the task allocation and is sent by robotic nodes to ensure that the solution with the majority positive verification results resolves the conflict. Role switch happens when a robotic node changes its role during runtime. The robotic node communicates this information with a role switch message that includes the updated role.

Figure 10:
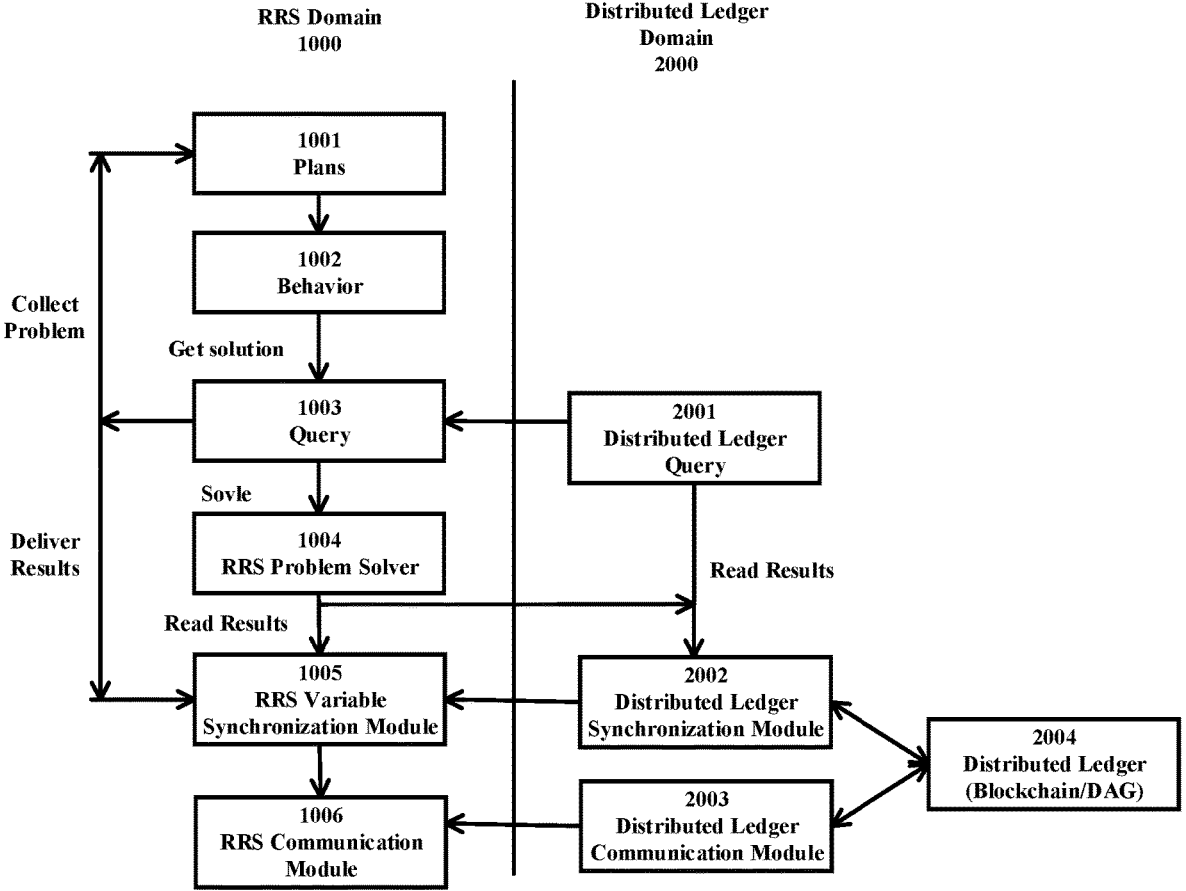
FIG. 10 is an exemplary diagram showing RRS querying components with distributed ledger integration, according to embodiments of the present embodiments.

FIG. 10 is an exemplary diagram showing RRS querying components with distributed ledger integration, according to embodiments of the present embodiments.

As shown in FIG. 10, a flow chart of how distributed ledger is integrated into the RRS components is shown by presenting the exemplary query process. A detailed description of the interaction between RRS domain and DL domain could be found.

As shown in FIG. 10, a node (such as the first network node 100), defined in RRS domain 1000, may execute behavior 1002 according local plans 1001. The plans 1001 may contain problems collected from interactions with environment. To get a proper solution, the node firstly sends out query 1003 by gossip protocol to spread over the distributed ledger network. Nodes (such as the second network node 200), defined in distributed ledger domain 2000, will accept the query, as a distributed ledger query 2001, and check whether their local storage have a solution or not, the results will be broadcast to the distributed ledger network for a synchronization, via a distributed ledger synchronization module 2002. The consensus scheme of distributed ledger 2004, based on either blockchain or DAG, will verify all possible results via byzantine agreement to get a consistent solution and broadcast to network again to align as the final conclusion. Then, the execution node will get the solution proposal. It solves the solution via RRS problem solver 1004 to work out a plan with key RRS variables. These variables are sent to distributed ledger, via RRS variable synchronization module 1005, to verify whether they are qualified or not. If they are qualified RRS variable, they will be synchronized with the execution node for execution. Any further event trigger will be performed by RRS communication module 1006, which is coupled with distributed ledger via distributed leger communication module 2003, to provide real-time solutions.

Without limitation, based on the module/program, relating to distributed ledger, installed on the robotic node, a first network node may have any kind of mapping relationship with a second network node. For example, the mapping relationship between nodes in two domains of the network may comprise at least one of: one to one, one to multiple, multiple to one.

In embodiments of the present disclosure, the method performed at the second network node 200 may further comprise: storing the verification result into distributed ledger.

In embodiments of the present disclosure, a second network node in the plurality of second network nodes may verify the solution, based on a historical record about a solution to the same task. In embodiments of the present disclosure, the historical record about the solution to the same task may comprise a set of criteria for computing out the solution to the task. In embodiments of the present disclosure, the historical record may be stored in a distributed ledger in the network.

According to the embodiments of the present disclosure, the physical swarm robotics system may be integrated with the virtual domain/network of a distributed ledger. The distributed ledger not only provides consensus mechanism for each verification procedure, but also serves as a basis for shared knowledge about solution for tasks.

In embodiments of the present disclosure, the distributed ledger may comprise a serial data structure, or a parallel data structure.

In embodiments of the present disclosure, the serial data structure may comprise a plurality of data blocks linked in a chain.

In embodiments of the present disclosure, the parallel data structure may be based on a directed acyclic graph.

Figure 11:
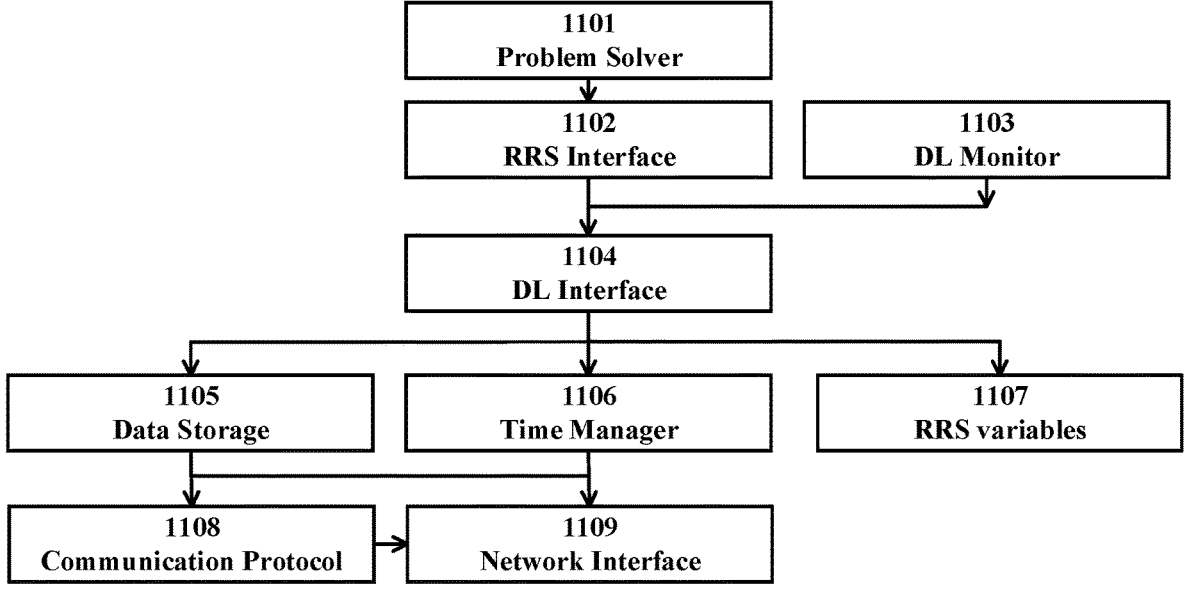
FIG. 11 is an exemplary diagram showing components of the distributed ledger architecture, according to embodiments of the present embodiments.

FIG. 11 is an exemplary diagram showing components of the distributed ledger architecture, according to embodiments of the present embodiments. In FIG. 11, the arrows indicate relationships between the modules. FIG. 11 mainly concerns the synchronized clock and the variable storage for the implementation of the distributed-ledger-based decisions.

With integration of both RRS and distributed ledger (DL), the autonomous swarm robotic decision process architecture is constructed. The core of distributed ledger is composed of six component types: the middleware interface 1104, a data store 1105, a time manager 1106, variables 1107, the communication protocol 1108, and a low-level network interface 1109. Furthermore, the distributed ledger supports complex data types as proposal values. To transmit such values over the network interface, a serialization component is required. The distributed ledger is furthermore embedded in two applications: the distributed ledger monitor 1103 and the RRS communication interface 1102, which may communicate with either problem solver 1101 or distributed ledger interface 1104. The software architecture of distributed ledger is shown in FIG. 11.

In FIG. 11, the RRS interface is a lightweight software module realizing the communication facilities of RRS and giving access to the distributed ledger negotiation process. Thus, the RRS messages are serialized and transmitted with consistency and the collection acceptance method. The RRS interface implements proposal change subscriptions and forwards received messages to RRS. For the separation of the different RRS messages, a distinct distributed ledger (DL) variable for each message type can be used. This setup imitates a publish subscribe-based middleware.

As an exemplary practical example without limitation, an indoor positioning navigation and mapping swarm robotics system is further illustrated. Without any limitation, such swarm robotics system is particularly practicable in environments without GPS satellite positioning, such as indoor, cave and pipeline. It is very useful to map the internal structure of such environment by cluster robotics to provide navigation information, especially when it is not suitable for human operation/survival.

The local robotic node in the swarm robotics system is configured to perform surveying modeling according to the distance, orientation, and environmental feature information, and extract a feature construction coordinate system. The local robot node may further determine positioning information of other robot nodes in the coordinate system.

The local robotic node may include: a database building module, configured to establish a location information database according to the distance, orientation, and environment feature information; a comparison module, configured to compare the received distance, orientation, and environmental feature information with the positioning information of the location information database, and determine positioning information of each robot node in the coordinate system according to the comparison result; a communication module, configured to receive return request information broadcast by the other node, and determine return path information of the corresponding robot node according to real-time location information of the robot node in the coordinate system that sends the return request information. The return path information is further sent to the corresponding robot node.

Each robotic node generates its own distance, orientation, and environment feature information in a room/space, and uploads the distance, location, and environment feature information to the distributed ledger network.

The local robotic node performs mapping modeling according to the distance, orientation, and environmental feature information via local sensors, extracts a feature construction coordinate system, and determines positioning information of all nodes in the first network (RRS network) in the coordinate system.

The steps for the local robot node to perform surveying and mapping according to the distance, orientation, and environmental feature information are as follows:

1. The local robot node establishes a location information database according to the distance, orientation, and environment feature information.
2. Positioning information of each robot node is broadcasted and determined in the coordinate system.

3. The distance, orientation, and environment feature information received by the local robot node are compared with the location information of database in distributed ledger, and the positioning information of each of the robot nodes in the coordinate system is determined according to the comparison result.

4. Positioning information of each robot node in the coordinate system is determined. The local robot node receives the return request information broadcast by the other robot node, and determines the return path information of the corresponding robot node according to the real-time position information of the other robot nodes in the coordinate system that sends the return request information. The return path information is further sent to the corresponding robot node.

Further, the steps for the robot node to broadcast the distance, orientation, and environmental feature information are as follows:

1. Each robot node senses and directly broadcasts the distance, orientation, and environmental feature information to the local robot node, or broadcasts the distance, orientation, and environmental feature information to all of the nodes via adjacent robot nodes.

2. The robot node, participated in consensus, directly transmits the positioning information in the coordinate system to the corresponding robot node, or the local robot node relays the positioning information of the other nodes in the coordinate system in sequence via a plurality of adjacent node relays until being transmitted to the target robot node.

Finally, the local robot will confirm the association according to the similar distance, bearing and environmental characteristics returned by different robot nodes. Once the similarity is confirmed to be a certain threshold, it is considered to be the same location, and the local server will calculate the statistics according to the location. The coordinates of the position in the coordinate system are finely adjusted to compensate for the historical data error and achieve higher precision. In other words, the more times the robot passes through the same location, the more accurate the coordinates calculated by the local robot at this location. This feature cooperates with clustered robot nodes based on distributed ledger information to achieve self-organizing and self-learning functions.

Figure 12:
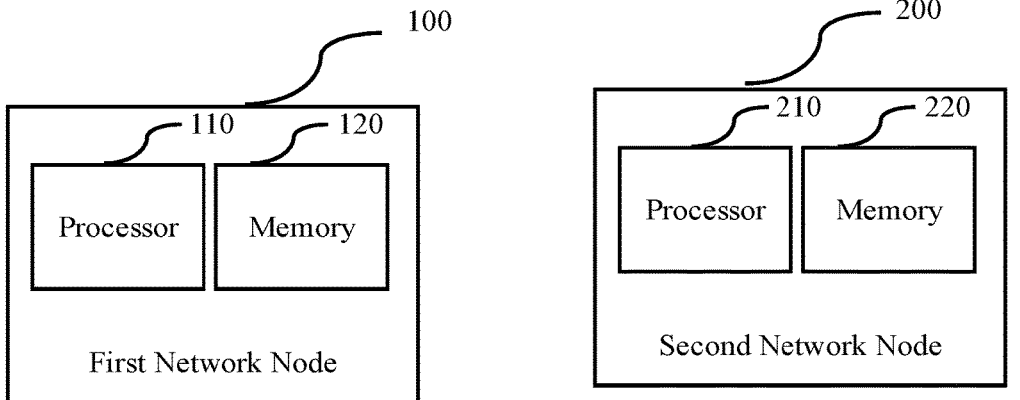
FIG. 12 is a block diagram showing apparatuses for the first network node, and the second network node, according to embodiments of the present disclosure.

FIG. 12 is an exemplary block diagram showing an apparatus for a first network node and an apparatus for a second network node, according to embodiments of the present disclosure.

As shown in FIG. 12, an apparatus for a first network node 100 may comprise: a processor 110; and a memory 120, containing instructions executable by the processor. The first network node 100 may be operative to: broadcast a solution for a task to a network; and perform the solution, when a plurality of verification results about the solution satisfy a predetermined condition; wherein the plurality of verification results is from a plurality of second network nodes in the network.

In embodiments of the present disclosure, the first network node 100 may be further operative to implement any of methods above mentioned.

As shown in FIG. 12, an apparatus for a second network node 200 may comprise: a processor 210; and a memory 220, containing instructions executable by the processor. The second network node 200 may be operative to: receive, from a network, a solution for a task of a first network node; verify the solution; and broadcast a verification result to the network. The solution is performed by the first network node, when a plurality of verification results about the solution satisfy a predetermined condition; and the plurality of verification results is from a plurality of second network nodes in the network.

In embodiments of the present disclosure, the second network node may be further operative to implement the any of methods above mentioned.

The processors 110, 210 may be any kind of processing component, such as one or more microprocessor or micro-controllers, as well as other digital hardware, which may include digital signal processors (DSPs), special-purpose digital logic, and the like. The memories 120, 220 may be any kind of storage component, such as read-only memory (ROM), random-access memory, cache memory, flash memory devices, optical storage devices, etc.

Figure 13:
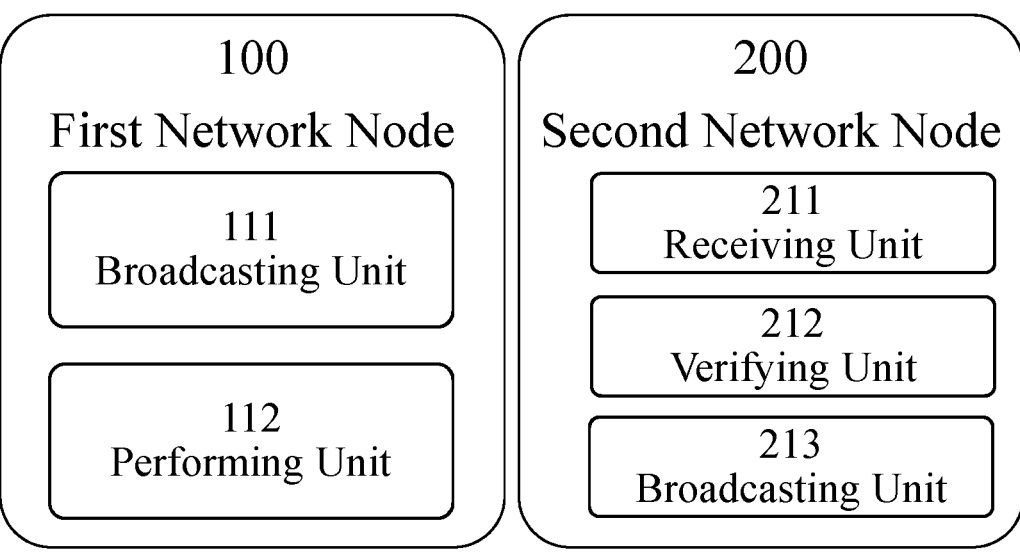
FIG. 13 is a schematic showing units of the apparatus for the first network node, and the second network node, according to embodiments of the present disclosure.

FIG. 13 is another exemplary block diagram showing an apparatus for a first network node and an apparatus for a second network node, according to embodiments of the present disclosure.

As shown in FIG. 13, an apparatus for a first network node 100 may comprise: a broadcasting unit 111, configured to broadcast a solution for a task to a network; and a performing unit 112, configured to perform the solution, when a plurality of verification results about the solution satisfy a predetermined condition. The plurality of verification results is from a plurality of second network nodes in the network.

In embodiments of the present disclosure, the first network node 100 and the corresponding units included therein may be further operative to implement any of methods as described above.

As shown in FIG. 13, an apparatus for a second network node 200 may comprise: a receiving unit 211, configured to receive from a network, a solution for a task of a first network node; a verifying unit 212, configured to verify the solution; and a broadcasting unit 213, configured to broadcast a verification result to the network. The solution is performed by the first network node, when a plurality of verification results about the solution satisfy a predetermined condition; and the plurality of verification results is from a plurality of second network nodes in the network.

In embodiments of the present disclosure, the second network node and the corresponding units included therein may be further operative to implement any of methods as described above.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the first network node 100, the second network node 200, may not need a fixed processor or memory, any computing resource and storage resource may be arranged from at least one network node/device/entity/apparatus in the communication system. The virtualization technology and network computing technology (e.g. cloud computing) may be further introduced, so as to improve the usage efficiency of the network resources and the flexibility of the network.

Figure 14:
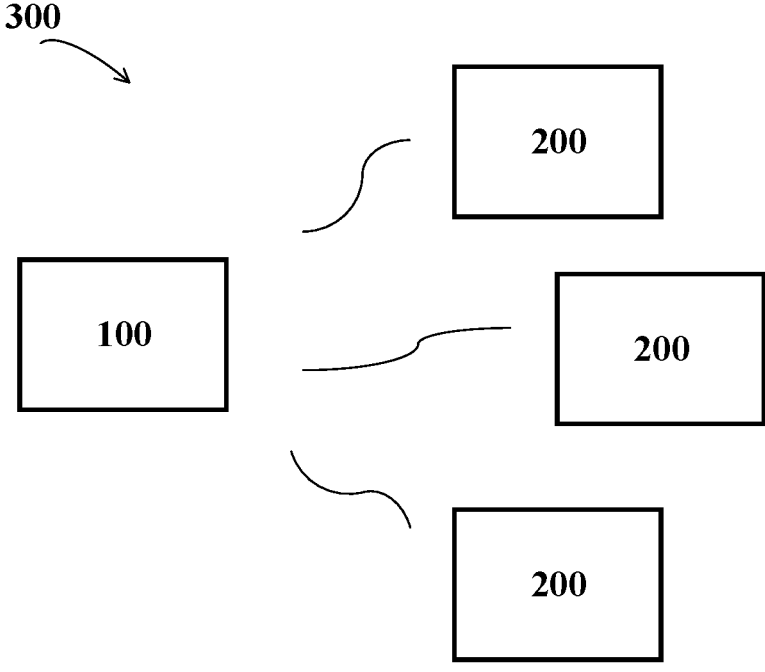
FIG. 14 is an exemplary block diagram showing a network including a first network node and a second network node, according to embodiments of the present disclosure.

FIG. 14 is an exemplary block diagram showing a network including a first network node and a second network node, according to embodiments of the present disclosure.

As shown in FIG. 14, a network 300 may comprise a plurality of network nodes. The plurality of network nodes may comprise at least one of: a first network node 100 as above mentioned, or a second network node 200 as above mentioned.

In embodiments of the present disclosure, the first network node 100 may be defined in an RRS domain of the network, and the second network node 200 may be defined in a distributed ledger domain of the network.

Figure 15:
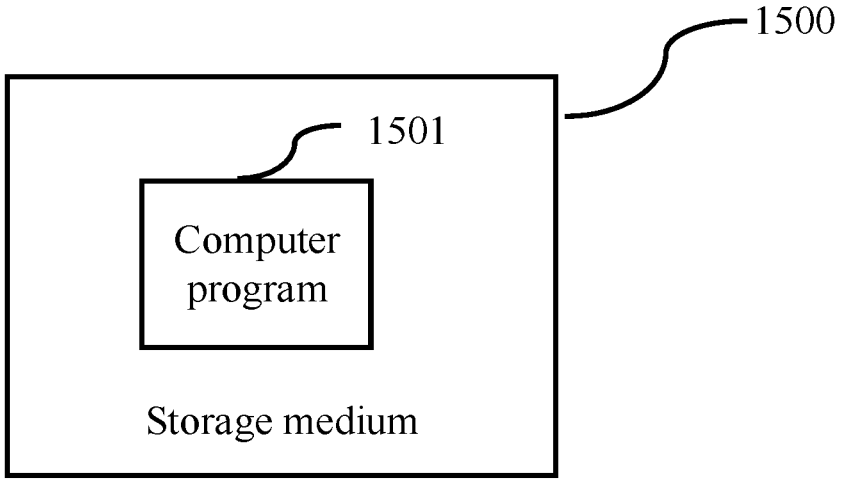
FIG. 15 is a block diagram showing an apparatus readable storage medium, according to embodiments of the present disclosure.

FIG. 15 is an exemplary block diagram showing an apparatus readable storage medium, according to embodiments of the present disclosure.

As shown in FIG. 15, an apparatus readable storage medium 1500 may have a program 1501 stored thereon. The program 1501 may be executable by an apparatus to cause the apparatus to carry out any of methods above mentioned.

The apparatus readable storage medium 1500 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Embodiments of the present disclosure propose a comprehensive solution to realize a decision process for teams of autonomous robotics via a novel consensus scheme of a distributed ledger. It guides the generation and negotiation of solution proposals. This process is adjustable to the problem setting, e.g., to achieve quick decisions or enable large number of participants and proposals.

According to embodiments of the present disclosure, the collaboration level between different network nodes for decision of how to operate is improved. Particularly, the network node may operate, based on verification results from other network nodes in the network, so as to improve the efficiency and security of the network.

Particularly, embodiments of the present disclosure may demonstrate following advantages.

(1) Decentralized Decision Making.

In many application scenarios, robotic nodes have to be divided into sub-groups that try to achieve partial goals. Therefore, robotic nodes may operate in separated locations. Therefore, a global communication link to a central decision making component cannot be guaranteed, especially when considering robotic node mobility in a range-limited communication setting. Hence, a cooperative decision making approach has to be fully decentralized via embodiments of the present disclosure.

For example, in some embodiments of the present disclosure, a method performed at a first network node comprises: broadcasting a solution for a task to a network; and performing the solution, when a plurality of verification results about the solution satisfy a predetermined condition. The plurality of verification results is from a plurality of second network nodes in the network.

That is, the first network node makes decisions with considering feedbacks from the a plurality of second network nodes, rather than only by the first network node itself or by a direct instruction from a center manager. Thus, a cooperative decision making approach within ordinary/decentralized nodes can be achieved.

(2) Shared Knowledge.

In particular, large-scale or dynamic environments with many agents interacting with a potentially high number of relevant world entities make it almost impossible to establish a coherent shared world model. This is caused by the bandwidth limitations of common network interfaces that prohibit all robotic nodes' observations to be continuously shared within the group. As a result, traditional robotics cannot rely on a shared knowledge base to make common decisions.

However, embodiments of the present disclosure use a distributed ledger to solve this difficulty.

For example, in some embodiments of the present disclosure, a verification result may be saved into distributed ledge. Further, a second network node in the plurality of second network nodes may verify the solution, based on a historical record about a solution to the same task. In embodiments of the present disclosure, the historical record about the solution to the same task may comprise a set of criteria for computing out the solution to the task. In embodiments of the present disclosure, the historical record may be stored in a distributed ledger in the network.

The second network node may not only provide a verification result for the solution of the task, but also may provide a new solution computed based on new set of criteria. Different solutions, and different set of criteria may also be broadcast to the network and thus be shared.

Therefore, the distributed ledger not only provides consensus mechanism for each verification procedure, but also serves as a basis for shared knowledge about solution for tasks.

(3) Dynamic Configurations.

Even in 5G, wireless communication interfaces have limitations in the communication range. Moreover, the environment constrains the communication range of robotic systems. For example, obstacles such as walls or uneven terrain may result in reflections and interference in the hardware layer, which may reduce the communication range of these nodes drastically. Since autonomous robotic nodes change their locations to implement their tasks, they can engage or leave each other's communication range. As a consequence, a distributed robot decision process needs the ability to adapt to new group configurations. Engaging robotic nodes have to be discovered and incorporated into the decision process to allow for decisions, which are coherent in a local sub-group.

For example, in some embodiments of the present disclosure, a distributed ledger domain of the network is flexible, and does not request fixed robotics nodes. The consensus soft module/program is easy to be distributed to each robotics node. That is, any robotics nodes available in the communication range will be useful for cooperative decision making and any one not in the communication range will be ignored without harm.

The distributed ledger domain may be dynamically configured, or even automatically applicable.

(4) Consensus Robustness.

Robotic observations are usually noisy and error prone. Consequently, the decisions made upon these observations suffer from the same issues. In some cases, this might lead to conflicting decision proposals. Hence, one of the key requirements in distributed decision processes is the ability to resolve these conflicts to achieve robust coherent decisions.

For example, in some embodiments of the present disclosure, the predetermined condition may be defined via a consensus mechanism developed in the network.

Particularly, in some embodiments of the present disclosure, the consensus mechanism may comply with a byzantine protocol. The predetermined condition may comprise that a proportion of second network nodes which give a positive verification result in the network is equal to or greater than a predetermined value. The predetermined value may be $2/3$.

In some embodiments of the present disclosure, the predetermined condition may comprise that a number of second network nodes which give a positive verification result is equal to or greater than a predetermined value.

That is, a solution with majority positive verification results may resolve any possible conflicts.

(5) Fault Tolerance.

Like in every distributed setting, network errors might occur, which usually results in lost data packets. A robotic decision process needs to address the problem of missing or delayed packets such that robotic nodes can detect network errors and detect decisions conflicting with each other. This is necessary to enable a robotic node to correct wrong decisions to preserve a minimum level of safety properties.

For example, in some embodiments of the present disclosure, different solutions/decisions are broadcast to the network and a plurality of second network nodes in the distributed ledger domain of the network may give a plurality of verification results for each solution to a task. Those decisions conflicting with each other may be easily detected. Further those solutions with many negative verification results may be handled as errors due to any reason, such as network failure or node failure.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed at a first network node, comprising:

broadcasting a solution for a task to a network; and performing the solution, when a plurality of verification results about the solution satisfy a predetermined condition;

wherein the plurality of verification results is from a plurality of second network nodes in the network;

wherein the first network node is an autonomous robot for taking a decision via a consensus mechanism of a distributed ledger; and wherein the solution is based on a predetermined robotic rule set, RRS, defining allowable node behaviors for the first network node.

2. The method according to claim 1, wherein the predetermined condition is defined via a consensus mechanism developed in the network; and wherein the consensus mechanism complies with a byzantine protocol.

3. The method according to claim 2, wherein the predetermined condition comprises that a proportion of second network nodes which give a positive verification result in the network is equal to or greater than a predetermined value.

4. The method according to claim 3, wherein the predetermined value is $2/3$.

5. The method according to claim 1, wherein a second network node in the plurality of second network nodes verifies the solution, based on a predetermined robotic rule set, defining allowable node behaviors for the second network node; and/or wherein the first network node proposes the solution for the task, based on a predetermined robotic rule set, defining allowable node behaviors for the first network node.

6. The method according to claim 1, wherein the predetermined robotic rule set comprises at least one of:

a plan tree, configured to identify a current plan and a state of the first network node;

a solver result, including a consensus result obtained from a distributed ledger;

a synchronization, including a handshake among other network nodes;

an allocation authority, including a conflict resolution for a task which is sent by robotic nodes to ensure that a solution with majority positive verification results resolves the conflict; and a role switch, which happens when the first network node changes its role during runtime.

7. The method according to claim 1, wherein the first network node comprises at least one of: a logistics robotic, an inspection robotic, a vehicle, or an emergency detection or response robotic.

8. A method performed at a second network node, comprising:

receiving, from a network, a solution for a task of a first
network node;
verifying the solution; and
broadcasting a verification result to the network;
wherein the solution is performed by the first network
node, when a plurality of verification results about the
solution satisfy a predetermined condition;
wherein the plurality of verification results is from a
plurality of second network nodes in the network;
wherein the first network node is an autonomous robot for
taking a decision via a consensus mechanism of a
distributed ledger; and
wherein the solution is based on a predetermined robotic
rule set, RRS, defining allowable node behaviors for
the first network node.

9. The method according to claim 8, wherein the prede-
termined condition is defined via a consensus mechanism
developed in the network; and wherein the consensus
mechanism complies with a byzantine protocol.

10. The method according to claim 9, wherein the pre-
determined condition comprises that a proportion of second
network nodes which give a positive verification result in the
network is equal to or greater than a predetermined value.

11. The method according to claim 10, wherein the
predetermined value is ⅔.

12. The method according to claim 8, wherein the second
network node verifies the solution, based on a historical
record about a solution to the same task; and wherein the
historical record about the solution to the same task com-
prises a set of criteria for computing out the solution to the
task.

13. The method according to claim 12, wherein the
historical record is stored in a distributed ledger in the
network; and wherein the distributed ledger comprises a
serial data structure, or a parallel data structure.

14. The method according to claim 13, wherein the serial
data structure comprises a plurality of data blocks linked in
a chain; or wherein the parallel data structure is based on a
directed acyclic graph.

15. The method according to claim 8, wherein the second
network node verifies the solution, based on a predetermined
robotic rule set, defining allowable node behaviors for the
second network node; and/or wherein the first network node
proposes the solution for the task, based on a predetermined
robotic rule set, defining allowable node behaviors for the
first network node.

16. The method according to claim 8, wherein the pre-
determined robotic rule set comprises at least one of:
a plan tree, configured to identify a current plan and a state
of the first network node;
a solver result, including a consensus result obtained from
a distributed ledger;

a synchronization, including a handshake among other
network nodes;
an allocation authority, including a conflict resolution for
a task which is sent by robotic nodes to ensure that a
solution with majority positive verification results
resolves the conflict; and
a role switch, which happens when the first network node
changes its role during runtime.

17. The method according to claim 8, wherein the second
network node comprises at least one of: a logistics robotic,
an inspection robotic, a vehicle, or an emergency detection
or response robotic.

18. An apparatus for a first network node, comprising:
a processor; and
a memory, containing instructions executable by the pro-
cessor;
wherein the first network node is operative to:
broadcast a solution for a task to a network; and
perform the solution, when a plurality of verification
results about the solution satisfy a predetermined
condition;
wherein the plurality of verification results is from a
plurality of second network nodes in the network;
wherein the first network node is an autonomous robot
for taking a decision via a consensus mechanism of
a distributed ledger; and
wherein the solution is based on a predetermined
robotic rule set, RRS, defining allowable node
behaviors for the first network node.

19. An apparatus for a second network node, comprising:
a processor; and
a memory, containing instructions executable by the pro-
cessor;
wherein the second network node is operative to:
receive, from a network, a solution for a task of a first
network node;
verify the solution; and
broadcast a verification result to the network;
wherein the solution is performed by the first network
node, when a plurality of verification results about
the solution satisfy a predetermined condition; and
wherein the plurality of verification results is from a
plurality of second network nodes in the network;
wherein the first network node is an autonomous robot
for taking a decision via a consensus mechanism of
a distributed ledger; and
wherein the solution is based on a predetermined
robotic rule set, RRS, defining allowable node
behaviors for the first network node.

*     *     *     *     *